US008630527B2

(12) United States Patent
Mikawa

(10) Patent No.: US 8,630,527 B2
(45) Date of Patent: Jan. 14, 2014

(54) IMAGE EDITING APPARATUS AND METHOD FOR CONTROLLING THE SAME, AND STORAGE MEDIUM STORING PROGRAM

(75) Inventor: Takuma Mikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 13/028,929

(22) Filed: Feb. 16, 2011

(65) Prior Publication Data

US 2011/0206352 A1 Aug. 25, 2011

(30) Foreign Application Priority Data

Feb. 19, 2010 (JP) ................................. 2010-035249

(51) Int. Cl.
*H04N 5/765* (2006.01)
(52) U.S. Cl.
USPC ............ 386/232; 386/284; 386/335; 386/207
(58) Field of Classification Search
USPC .................................. 386/232, 284, 335, 207
See application file for complete search history.

(56) References Cited

U.S. PATENT DOCUMENTS

| 7,103,260 | B1 | 9/2006 | Hinson | |
|---|---|---|---|---|
| 7,778,470 | B2* | 8/2010 | Aoki | 382/225 |
| 2002/0063807 | A1* | 5/2002 | Margulis | 348/745 |
| 2006/0171687 | A1* | 8/2006 | Aiso | 386/120 |
| 2008/0018793 | A1* | 1/2008 | Lee et al. | 348/581 |
| 2008/0094487 | A1* | 4/2008 | Tojima | 348/231.99 |
| 2008/0112692 | A1* | 5/2008 | Chiu et al. | 386/126 |
| 2009/0052551 | A1* | 2/2009 | Kitamura | 375/240.26 |
| 2009/0147131 | A1* | 6/2009 | Mikawa | 348/445 |
| 2009/0208123 | A1* | 8/2009 | Doswald | 382/236 |
| 2010/0053345 | A1* | 3/2010 | Kim et al. | 348/208.4 |
| 2010/0091181 | A1* | 4/2010 | Capps | 348/441 |
| 2010/0157090 | A1* | 6/2010 | Kobayashi et al. | 348/222.1 |

FOREIGN PATENT DOCUMENTS

JP 2000-324453 A 11/2000

\* cited by examiner

*Primary Examiner* — Helen Shibru
(74) *Attorney, Agent, or Firm* — Canon USA Inc. IP Division

(57) ABSTRACT

The present invention is directed to an image editing apparatus that automatically selects an appropriate frame rate that improves image quality of a new moving image generated by combining a plurality of moving images having different frame rates to prevent a user from working much on the selection, when the user newly creates a moving image. The image editing apparatus of the present invention classifies a plurality of moving images to be combined into groups based on a frame rate, compares an amount of moving images included in each of the groups, and selects the group having the largest amount of moving images belonging thereto. Further, the image editing apparatus compares the amounts of the moving images for respective frame rates included in the selected group to select the frame rate which the largest amount of the moving images has. The image editing apparatus converts moving image to be combined into the selected frame rate and then combines the plurality of converted moving images.

9 Claims, 10 Drawing Sheets

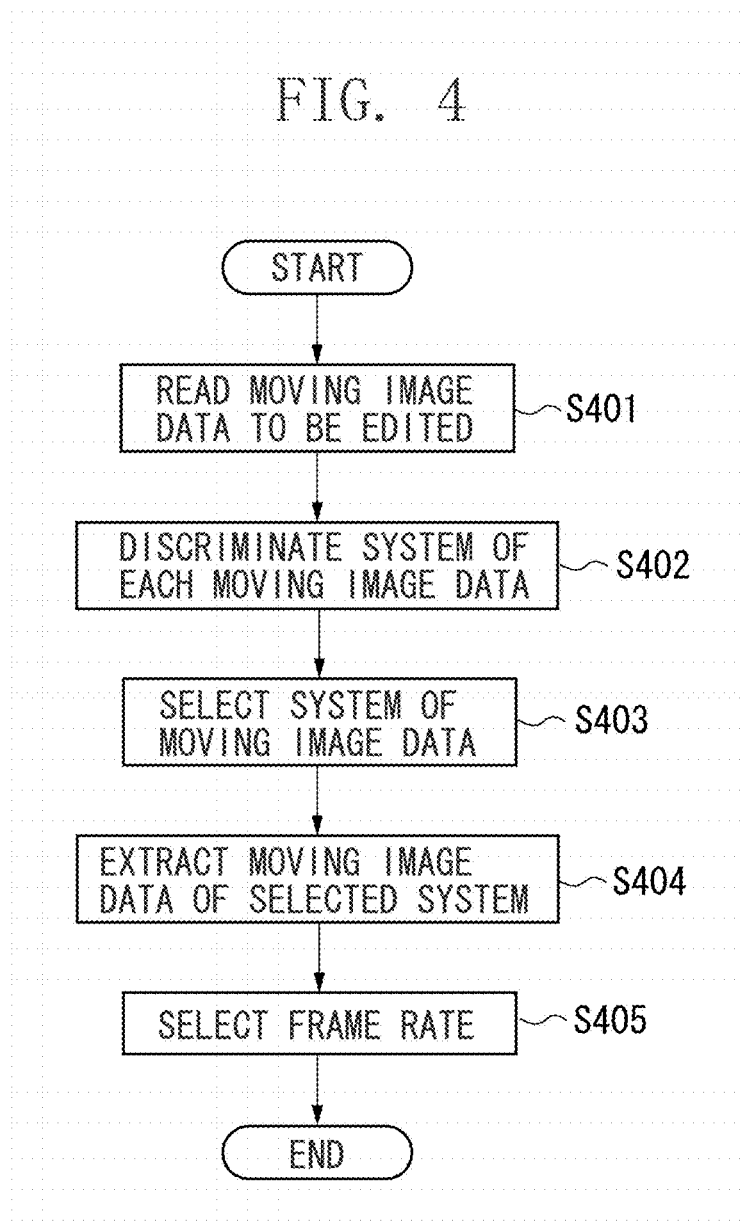

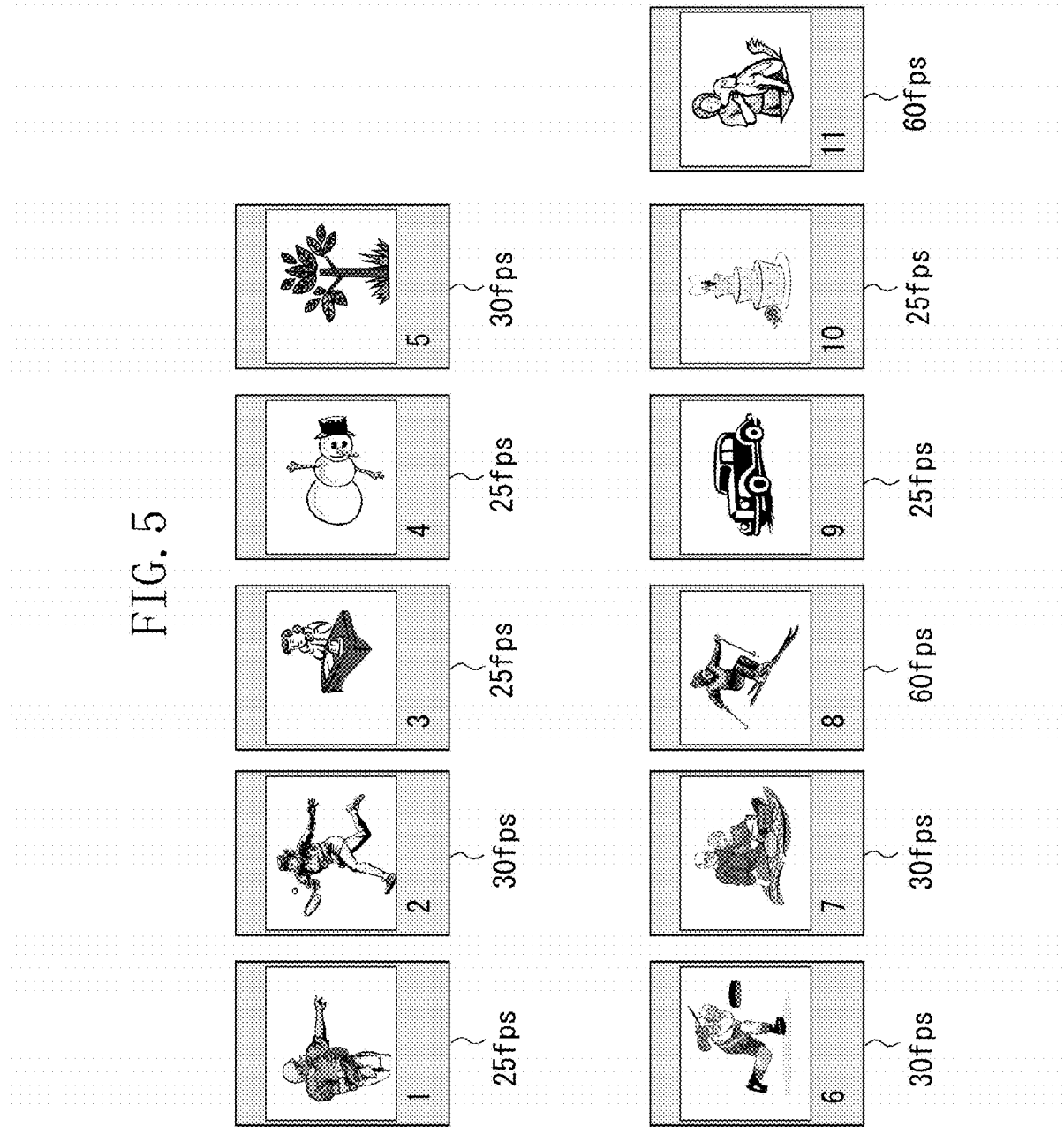

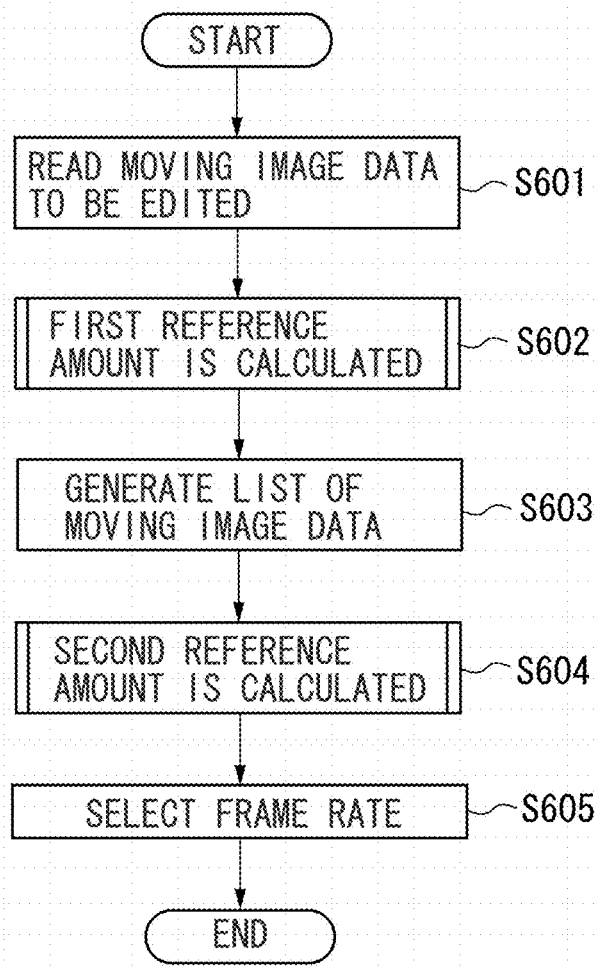

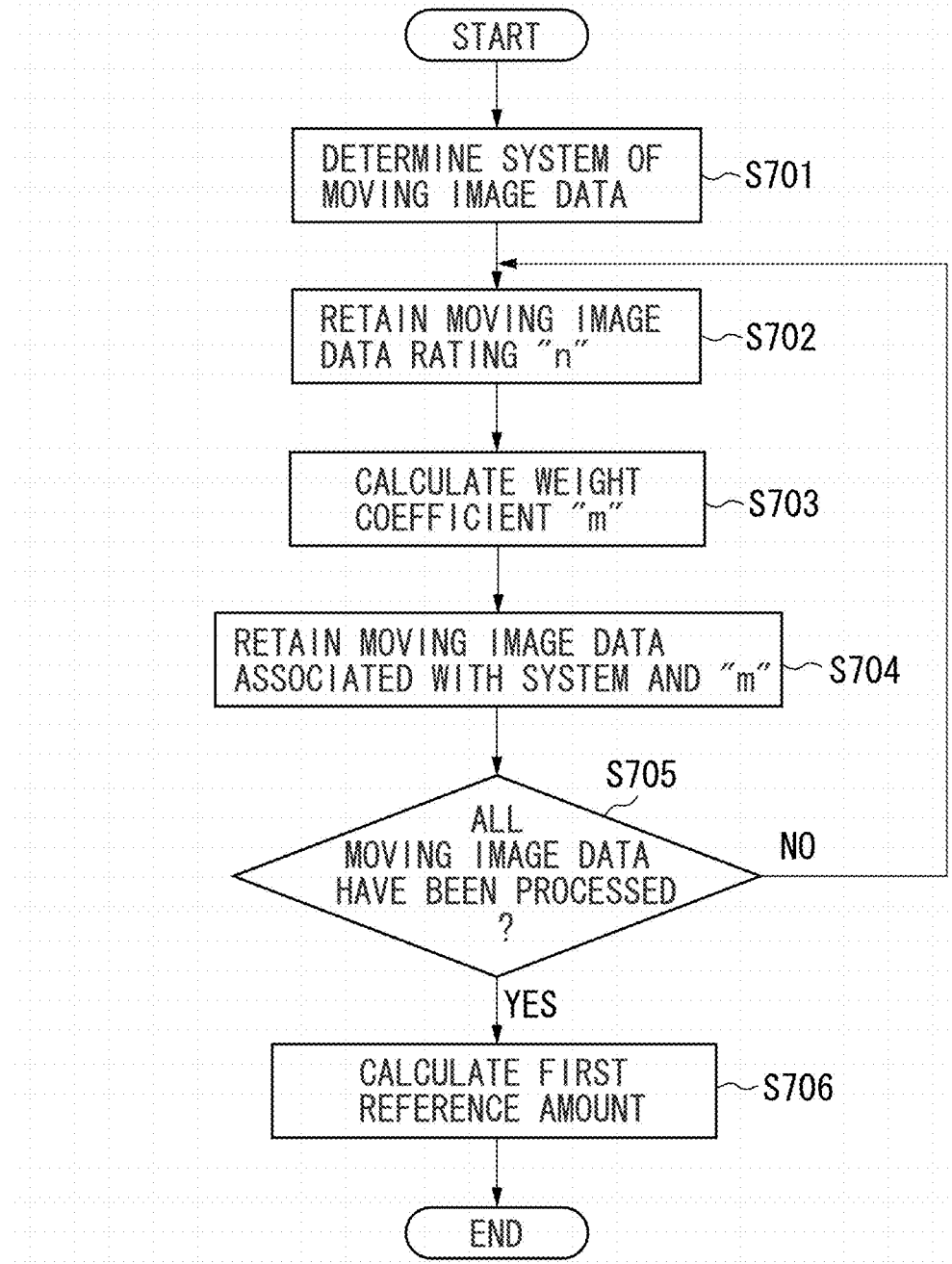

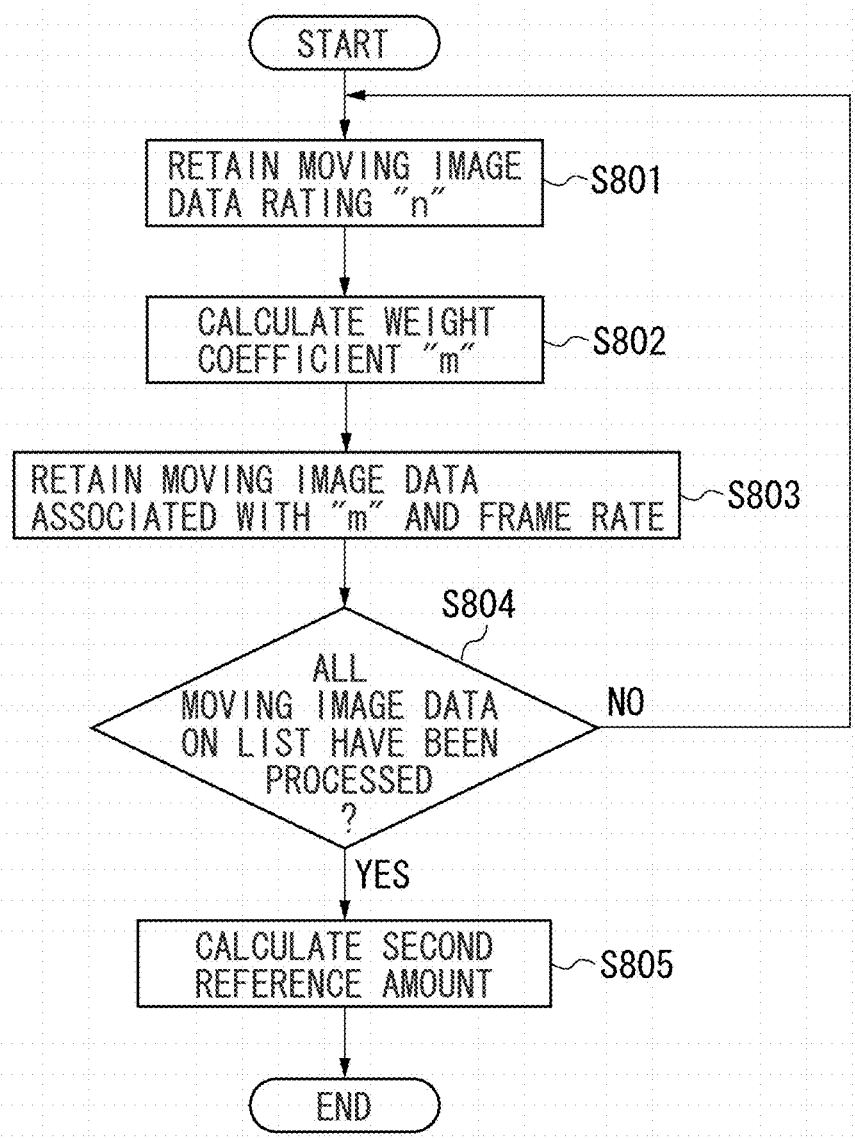

IMAGE EDITING APPARATUS AND METHOD FOR CONTROLLING THE SAME, AND STORAGE MEDIUM STORING PROGRAM

BACKGROUND OF THE INVENTION

1. Field of the Invention

The present invention relates to an image editing apparatus for editing a plurality of moving images and a method for controlling the image editing apparatus, and a program thereof.

2. Description of the Related Art

There is a plurality of different types of systems for video signals. For example, the systems include a standard format for each of an analog television (TV) broadcasting developed by a national television system committee (NTSC) and a phase alternation by line (PAL), and a format for film movies.

In such formats, the frame rates are different from each other, and thus a type of video signal is converted into another type of video signal with a different frame rate available by an output device (refer to Japanese Patent Application Laid-Open No. 2000-324453).

On the other hand, in recent years, output devices such as a personal computer (PC) can deal with moving images in a plurality of formats, unlike the conventional television sets that can deal with only a video signal of a specified format. Further, the PC can download the moving image data in various types of formats from a world wide web (WEB) server via the Internet.

When a device capable of dealing with the moving images in the plurality of formats combines a plurality of moving images each in a different format to newly create one moving image, a user has to select which frame rate is to be adopted from among a plurality of frame rates, thereby imposing more work on the user. Further, for a user who is not familiar with operating the device, the user has difficulty in determining which frame rate is appropriate, and therefore may select erroneously. As a result, sometimes a smooth moving image cannot be obtained.

SUMMARY OF THE INVENTION

According to an aspect of the present invention, a moving image editing apparatus including: a classification unit configured to classify a plurality of moving images to be combined into groups according to a frame rate of the moving image, the moving image classified into a same group having a frame rate acquired by multiplying a same value by an integer; a first selection unit configured to select any one group from among the groups based on amounts of the moving image data belonging to the groups; a second selection unit configured to select anyone frame rate from among the frame rates of the moving images belonging to the selected group based on amounts of the moving image data for respective frame rates thereof belonging to the selected group; a conversion unit configured to convert a plurality of moving images to be combined into the frame rate selected by the second selection unit; and a combination unit configured to combine the plurality of converted moving images.

According to an aspect of the present invention, when a moving image is created by combining a plurality of moving images in different formats, an appropriate frame rate can be set without imposing much work on users.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an operation of the image editing apparatus according to an exemplary embodiment of the present invention.

FIG. 5 illustrates moving image data to be edited according to an exemplary embodiment of the present invention.

FIG. 6 is a flowchart illustrating an operation performed by the image editing apparatus according to an exemplary embodiment of the present invention.

FIG. 7 is a flowchart illustrating an operation performed by the image editing apparatus according to an exemplary embodiment of the present invention.

FIG. 8 is a flowchart illustrating an operation performed by the image editing apparatus according to an exemplary embodiment of the present invention.

DESCRIPTION OF THE EMBODIMENTS

Various exemplary embodiments, features, and aspects of the invention will be described in detail below with reference to the drawings.

However, configuration elements described in this exemplary embodiment are just examples, and not intended to limit the scope of the present invention.

In the present exemplary embodiment, a case will be described where an image editing apparatus creates one piece of moving image data by combining a plurality of pieces of moving image data having different frame rates. The image editing apparatus according to the present exemplary embodiment is to mix and combine the moving image data in an NTSC system in which the frame rate is acquired by multiplying 30 frames per second (fps) (29.97 fps) by an integer, a PAL system in which the frame rate is acquired by multiplying 25 fps by an integer, a film system in which the frame rate is 24 fps, and other systems.

More specifically, according to the present exemplary embodiment, the pieces of the moving image data belonging to the same system have the frame rates acquired by multiplying the same value by an integer, and the pieces of the moving image data belonging to the different systems have the frame rates acquired by multiplying the different vales by an integer. For example, in addition to the moving image data having the frame rate of 30 fps, the moving image data having the 60 fps acquired by multiplying "30" by two is also included in the NTSC system. On the other hand, the moving image data having the frame rate of 50 fps acquired by multiplying "25" by two does not belong to the NTSC system but the PAL system.

At first, with reference to a block diagram illustrated in FIG. 1, a configuration of the image editing apparatus of the present exemplary embodiment will be described.

Figure 1:
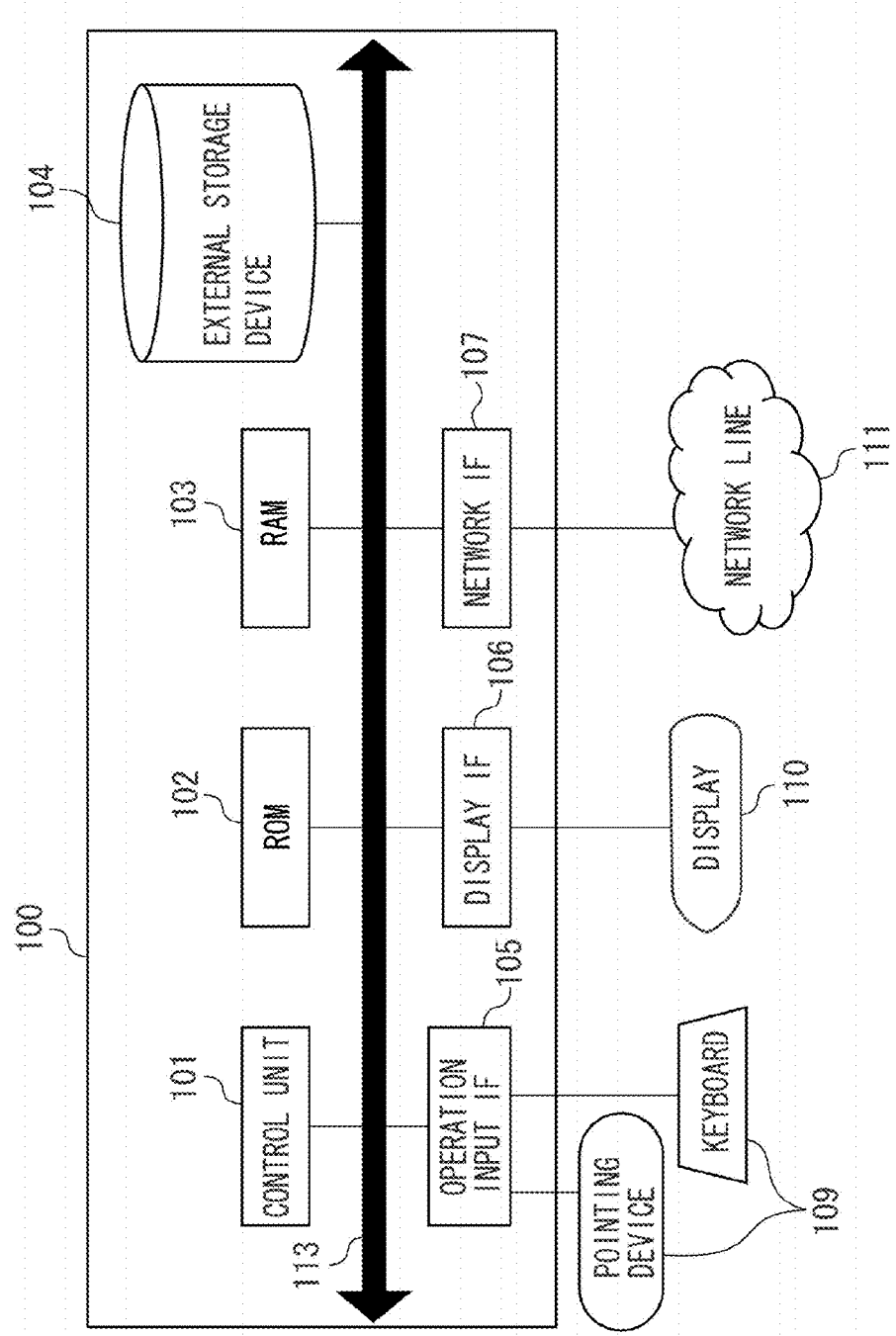
FIG. 1 is a block diagram illustrating a configuration of an image editing apparatus according to an exemplary embodiment of the present invention.

In FIG. 1, an image editing apparatus 100 can be realized by an information processing apparatus such as a personal computer (PC). A control unit 101 is, for example, a central processing unit (CPU) to entirely control the image editing apparatus 100. A read only memory (ROM) 102 stores programs and parameters that do not need to be changed. A random access memory (RAM) 103 temporarily stores programs and data supplied from an external device.

An external storage apparatus 104 includes a hard disk and a memory card that are fixedly provided to the image editing apparatus 100, or a memory card that is detachable from the image editing apparatus 100. The external storage apparatus 104 according to the present exemplary embodiment records digital data such as an operation system (OS), various types of programs, and image data. Particularly, the external storage apparatus 104 according to the present exemplary embodiment records in the control unit 101 a moving image editing program that will be described below as a computer-readable program code, which is executed by the control unit 101.

An interface 105 with an input device receives an operation performed by a user, and connects the image editing apparatus 100 with an input device 109 such as a pointing device (mouse) and a keyboard used for inputting data. A display 106 displays data retained by the image editing apparatus 100 and data supplied thereto. A display interface 106 connects the image editing apparatus 100 with a display 110.

A network interface 107 connects the image editing apparatus 100 with a network line 111 such as the Internet. A system bus 113 communicably connects each unit of 101, 102, 103, 104, 105, 106, and 107 with each other. In the present exemplary embodiment, an example is described where the moving image editing program is recorded in the external storage apparatus 104, however, the present invention can be applied to a case where the moving image editing program is recorded in the ROM 102 or is retained on the network.

In the present exemplary embodiment, an example will be described where the image editing apparatus is realized by the PC. Further, the present invention can be similarly applied to an imaging apparatus such as a digital camera.

Figure 2:
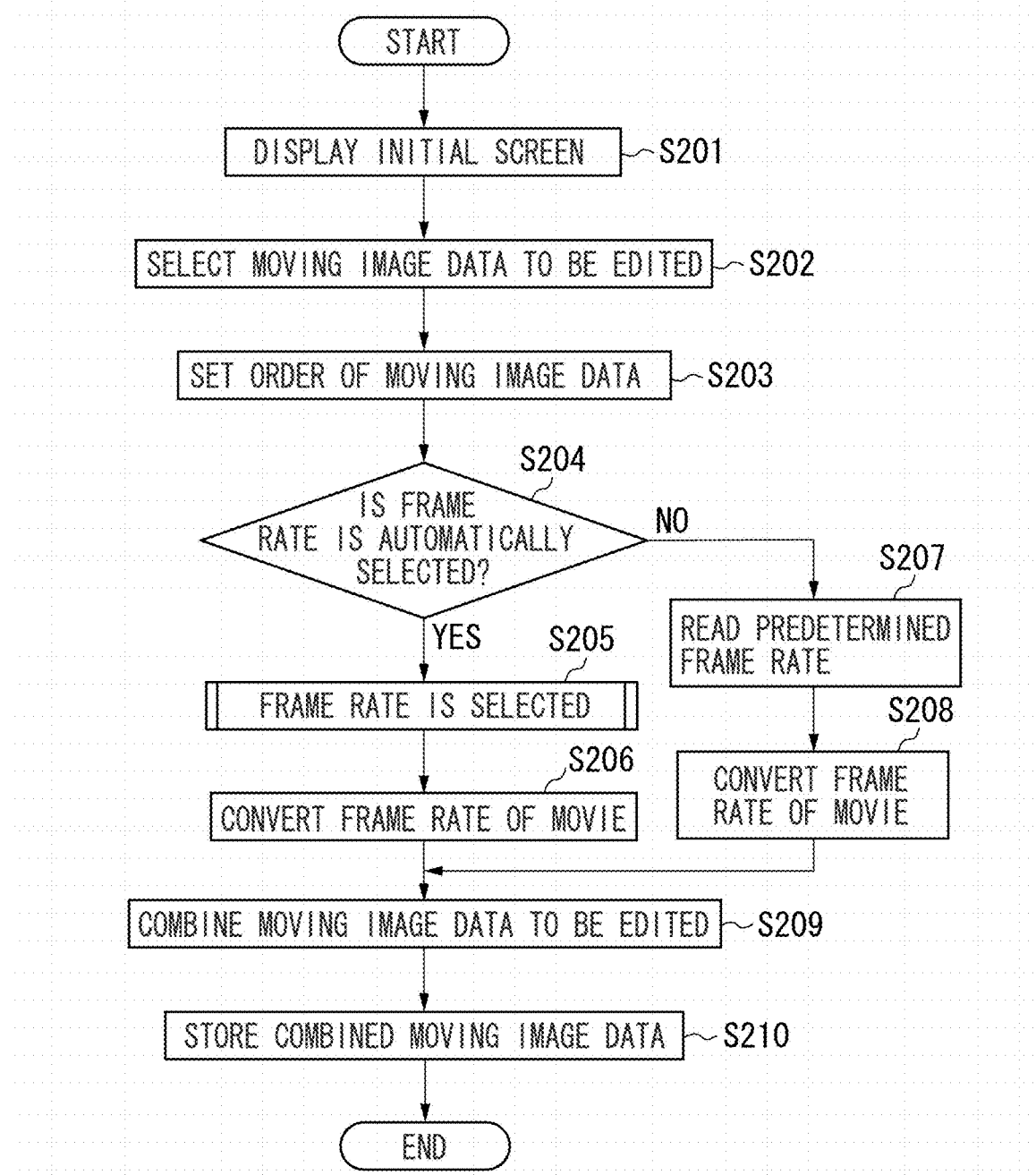
FIG. 2 is a flowchart illustrating an operation performed by the image editing apparatus according to an exemplary embodiment of the present invention.

Next, an operation performed by the image editing apparatus 100 of the present exemplary embodiment will be described with reference to a flowchart illustrated in FIG. 2. A following operation can be realized when the control unit 101 of the image editing apparatus 100 reads the OS or the moving image editing program from the external storage apparatus 104 to start them up.

In step S201, the control unit 101 displays on the display 110 the moving image selection screen in an initial state. In step S202, in response to the operation on the input device 109 performed by the user, the control unit 101 selects the moving image data to be edited from among the moving image data stored in the external storage apparatus 104, and in step S203, sets an order of the moving image data.

Figure 3A:
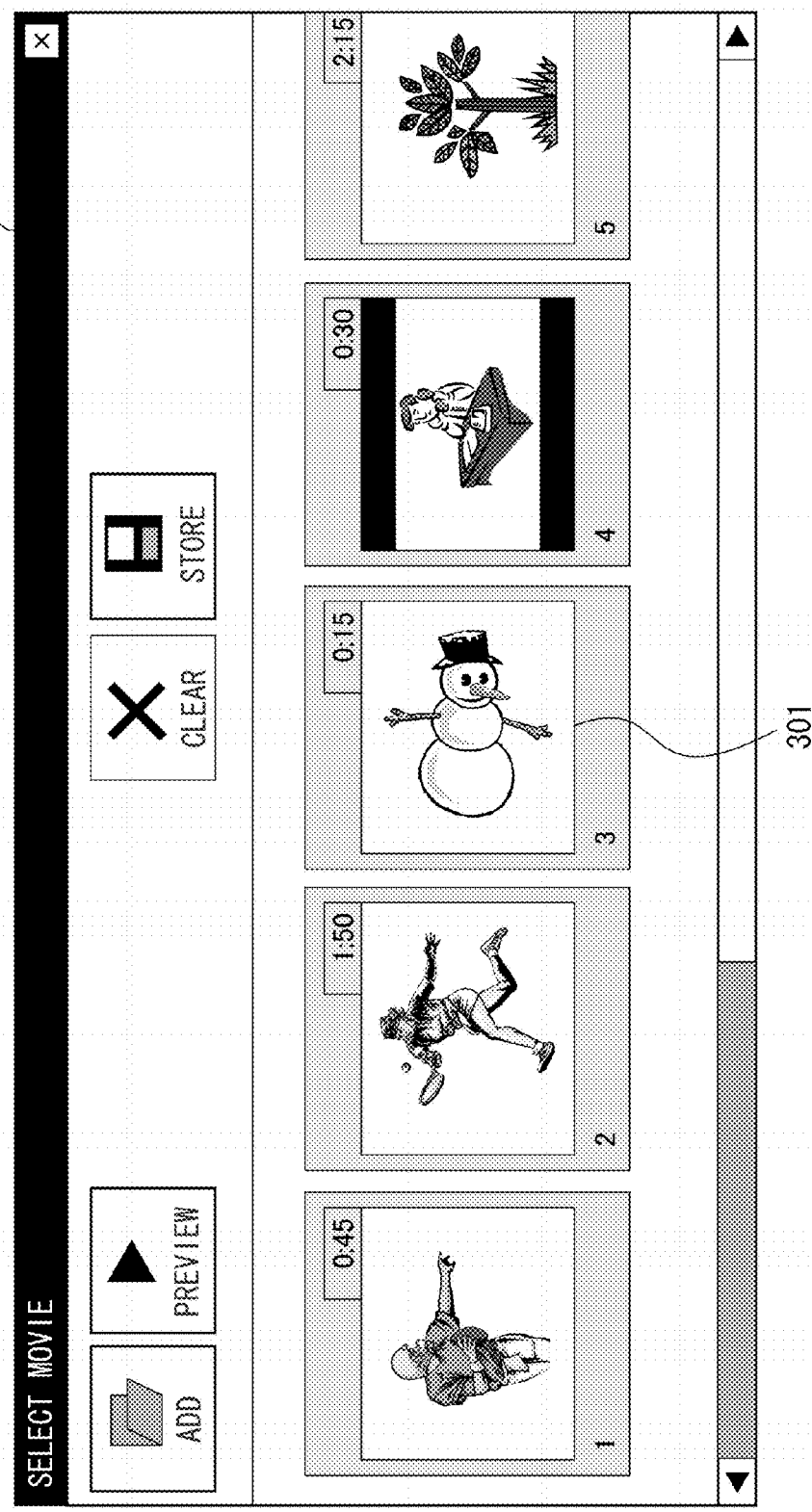
FIGS. 3A and 3B illustrate moving image selection screens according to an exemplary embodiment of the present invention.
Figure 3B:
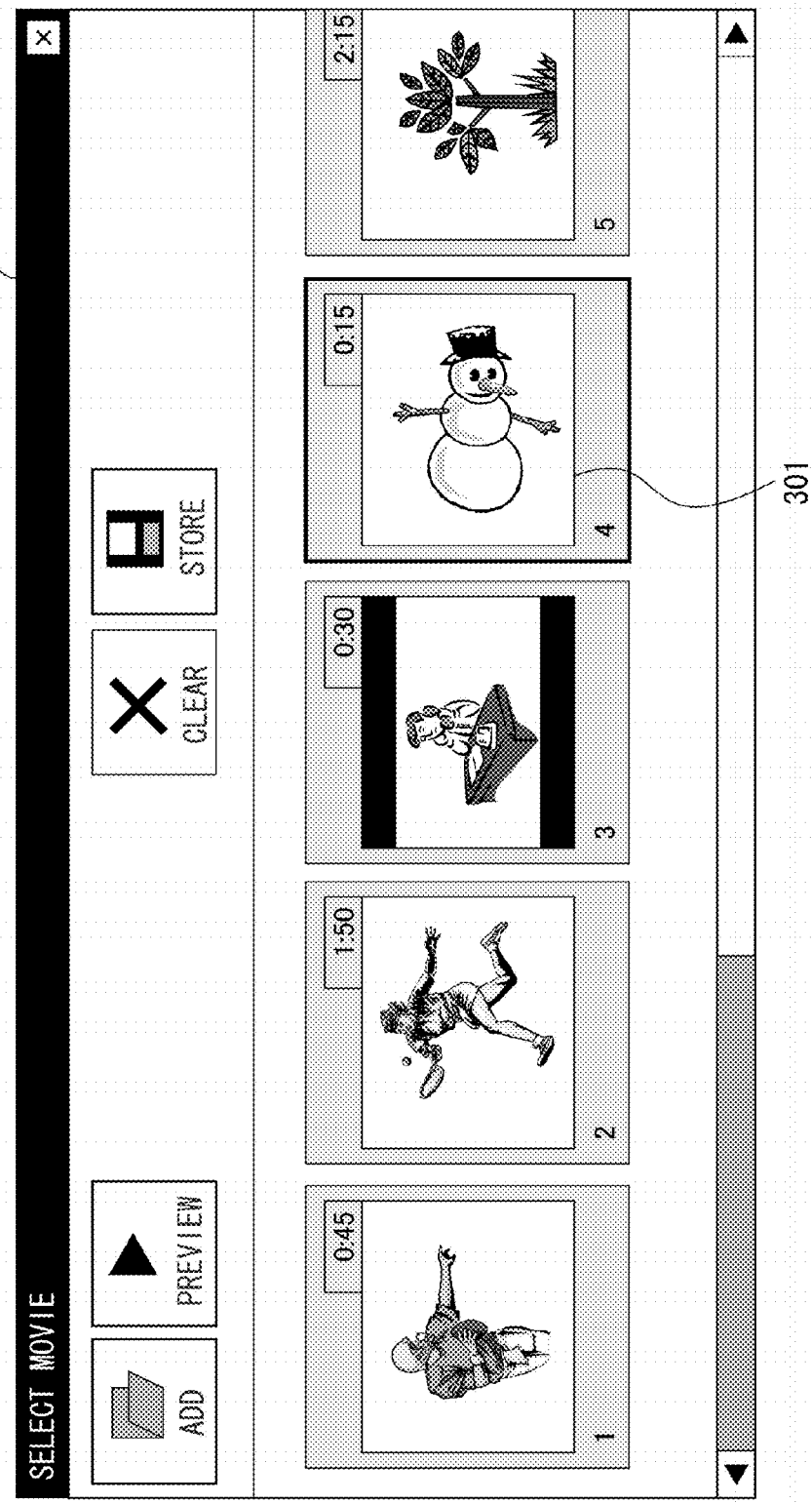

For example, in a moving image selection screen 300 illustrated in FIG. 3A, thumbnail images that correspond to the moving image data to be edited are placed with the first thumbnail image thereof being placed at the left side, are displayed. When the user operates the input device 109 to move a thumbnail image 301, in response to the operation, the thumbnail image 301 is changed in its place and displayed as illustrated in FIG. 3B. According to an order in which the thumbnail images are placed, the RAM 103 stores an order of the moving image data to be edited.

Next, in response to the operation on the input device 109 performed by the user, the control unit 101 starts edition processing of the moving image data to be edited, and determines whether to automatically select the frame rate in step S204. In response to the operation on the input device 109 performed by the user, the control unit 101 previously stores in the external storage apparatus 104 information about whether to automatically select the frame rate, in response to the operation on the input device 109 performed by the user. If the frame rate is not to be selected automatically, the external storage apparatus 104 stores a predetermined frame rate associated with moving image editing software.

When it is determined to automatically select the frame rate (YES in step S204), in step S205, the control unit 101 performs selection processing of the frame rate that will be described below. In step S206, the control unit 101 converts the frame rate of the moving image data to be edited into the frame rate selected in step S205.

On the other hand, when it is determined not to automatically select the frame rate (NO in step S204), in step S207, the control unit 101 reads the predetermined frame rate from the external storage unit 104. In step S208, the frame rate of the moving data to be edited is converted into the predetermined frame rate read in step S208. In steps S206 and S208, conversion processing of the frame rate is not performed on the moving image data having the same frame rate as the converted frame rate.

In step S209, the control unit 101 newly creates the moving image data by combining the moving image data to be edited after the frame rate is converted. In step S210, the external storage apparatus 104 stores the newly created moving image data.

Next, an operation will be described in which the image editing apparatus 100 of the present exemplary embodiment performs the selection processing of the frame rate in step S205 with reference to a flowchart illustrated in FIG. 4.

At first, in step S401, the control unit 101 reads the moving image data to be edited from the external storage apparatus 104. In step S402, based on the frame rate of each moving image data, the control unit 101 discriminates the system thereof to classify the moving image data to be edited into the system groups. In step S403, the control unit 101 compares the amounts of the moving image data included in the system groups and selects a system group with the largest amount of the moving image data.

The amount of the moving image data represents the number of the pieces of the moving image data, a reproduction time of the moving image data, or the number of frames. When a plurality of the system groups having the largest amount of the moving image data are present, according to a predetermined rule, the control unit 101 selects any one of the system groups. For example, when each of the PAL system group and the NTSC system group includes the same amount of the moving image data, the PAL system group is selected.

In step S404, the control unit 101 extracts the moving image data included in the system group selected in step S403 from among the moving image data to be edited. In step S405, the control unit 101 discriminates the frame rates of the extracted moving image data, and compares the amounts of the moving image data for the respective frame rates to select the frame rate which the largest amount of the moving image data has.

FIG. 5 illustrates an example of the moving image data to be edited according to the present exemplary embodiment.

In FIG. 5, eleven pieces of the moving image data are selected to be edited, and the order thereof is set. The first, third, fourth, ninth, and tenth moving image data belong to the PAL system having the frame rate of 25 fps. The second, fifth, sixth, and seventh moving image data belong to the NTSC system having the frame rate of 30 fps, and the eighth and eleventh moving image data belong to the NTSC system having the frame rate of 60 fps respectively.

If the amount of the moving image data is defined as the number of the pieces of the moving image data, six pieces of the moving image data in the NTSC system and five pieces of the moving image data in the PAL system are included in eleven pieces of the moving image data. Thus, in step S403, the control unit 101 selects the NTSC system. Further, since the NTSC system includes four pieces of moving image data having the frame rate of 30 fps and two pieces moving image data having the frame rate 60 fps, in step S405, the control unit 101 selects 30 fps.

In step S208, the control unit 101 performs processing for interpolating one frame for the moving image data having the frame rate of 25 fps every five frames, and processing for thinning the moving image data having the frame rate of 60 fps into half to convert them into the moving image data having the frame rate of 30 fps.

In the present exemplary embodiment, the moving image data included in two types of system groups, which are the NTSC system and the PAL system, are described. Further, the present exemplary embodiment can be applied to the moving image data included in other types of system groups in a similar manner.

Furthermore, in step S405, the control unit 101 selects the frame rate based on the amount of the moving image data, however, may select the frame rate based on other criteria. For example, regardless of the amount of the moving image data, the largest frame rate may be selected.

As illustrated in FIG. 5, when the frame rates of the moving image data included in the system group acquired in step S403 are 30 fps and 60 fps, the control unit 101 selects 60 fps. Further, in step S405, when a plurality of frame rates, which largest amounts of the moving image data has, are present, the control unit 101 may select the larger frame rate.

Moreover, in step S402, based on the frame rate of the moving image data, the control unit 101 discriminates the system thereof. However, the discrimination method is not limited thereto, and the control unit 101 may discriminate the system based on metadata indicating various types of information such as a type of a file given to the moving image data.

In the present exemplary embodiment as described above, first, based on the amount of the moving image data included in each system group of the moving image data to be edited, the system group is selected. Further, based on the amount of the moving image data included in the system group for each frame rate, the frame rate is selected.

With this arrangement, even if a plurality of pieces of the moving image data having the different frame rates are combined, non-continuous portions can be decreased to create the smooth moving image data.

For example, regarding the moving image data to be edited illustrated in FIG. 5, if, without considering the number of the pieces of the moving image data included in each system group, the frame rate of the largest amount of moving image data is selected only by comparing the numbers of the pieces of the moving image data for the respective frame rates, 25 fps is selected.

When the frame rate of 30 fps or 60 fps of the moving image data in the NTSC system is converted into the frame rate of 25 fps of the moving image data in the PAL system, in general, processing for thinning the frame is performed. For example, when the frame rate is 30 fps, one frame is thinned every six frames. When the frame rate is 60 fps, the frame is thinned into half, and further one frame is thinned every six frames.

As described above, when the frame rate is converted from the NTSC system into the PAL system, since a portion where frames of the moving image data are not placed at even intervals is generated, the moving image data does not continue smoothly. Therefore, smooth video cannot be obtained. Further, when the frame rate is converted from the PAL system into the NTSC system, since a portion where frames of the moving image data are not placed at equal intervals is similarly generated, the moving image data does not continue smoothly. Therefore, smooth video cannot be obtained in a similar manner as described above.

In a second exemplary embodiment, a case will be described where the frame rate is selected based on information about attributes associated with the moving image data. In the following descriptions, descriptions about similar configurations to those in the first exemplary embodiment will not be repeated, and unique configurations to the present exemplary embodiment will be described in detail. In the present exemplary embodiment, as the attribute information, rating information indicating importance of the moving image data will be described as an example, however, the present exemplary embodiment can be similarly applied to image sizes of the moving image data and recording rates thereof.

With reference to a flowchart illustrated in FIG. 6, an operation in which the image editing apparatus 100 according to the present exemplary embodiment performs the selection processing on the frame rate in step S205 will be described.

In step S601, the control unit 101 reads the moving image data to be edited from the external storage apparatus 104, and, in step S602, performs processing for calculating a first reference amount for each system group including the moving image data that will be described below. In step S603, the control unit 101 compares the first reference amounts for the respective system groups, and selects the system group having the largest first reference amount, and then generates a list of the moving image data included in the selected system group, which is stored in the RAM 103.

When a plurality of the system groups has the largest first reference amount, according to the predetermined rule, the control unit 101 discriminates any one of the system groups. For example, the control unit 101 selects the system group in the order of the NTSC system, the PAL system, the film system, and other systems.

Next, in step S604, the control unit 101 performs, on the moving image data associated with the list, the processing for calculating a second reference amount of the moving image data that will be described below. In step S605, the control unit 101 compares the second reference amounts for the respective frame rates and selects the frame rate with the largest second reference amount. When a plurality of frame rates has the largest second reference amount, the larger frame rate is selected.

Next, with reference to a flowchart illustrated in FIG. 7, an operation in which the image editing apparatus 100 according to the present exemplary embodiment performs processing for calculating the first reference amount in step S602 will be described.

In step S701, the control unit 101 reads one of the pieces of the moving image data to be edited from the external storage apparatus 104 and analyzes it, and, based on its frame rate, determines a type of its system. In step S702, the control unit 101 reads the rating information associated with the moving image data and retains it as a variable "n". In step S703, the control unit 101 substitutes the variable "n" into an equation "m=n/3" to calculate a weight coefficient "m".

The rating information in the present exemplary embodiment is defined as the integers 1, 2, 3, 4, and 5, and when the rating information is not associated with the moving image data, the control unit 101 retains "3" as an initial value of the variable "n". Further, an equation for calculating the weight coefficient "m" is not limited to the equation described above. In step S704, the control unit 101 retains in the RAM 103 the system and the weight coefficient "m" associated with the moving image data.

In step S705, the control unit 101 determines whether the processing has been performed on all moving image data, and the above-described processing is repeatedly performed on the rest of the moving image data. When the processing has been performed on all moving image data (YES in step S705), in step S706, the control unit 101 calculates a total sum of the weight coefficients "m" for respective system groups as the first reference amount.

Next, with reference to a flowchart illustrated in FIG. 8, an operation will be described in which the image editing apparatus 100 according to the present exemplary embodiment performs the processing for calculating the weight coefficient of the moving image data for each frame rate in step S604.

At first, in step S801, the control unit 101 reads one of the pieces of the moving image data on the list from the external storage apparatus 104 and analyzes it, reads the rating information associated with the moving image data from the external storage apparatus 104, and retain the rating information as the variable "n". In step S802, the control unit 101 substitutes the variable "n" in the equation "m=n/3" to calculate the weight coefficient "m". The equation for calculating the weight coefficient "m" is not limited thereto.

In step S803, the control unit 101 retains in the RAM 103 the frame rate and the weight coefficient "m" associated with the moving image data. In step S804, the control unit 101 determines whether the processing is performed on all moving image data on the list, and repeatedly performs the above-described processing on the rest of the moving image data on the list. When the control unit 101 has performed the processing on all moving image data on the list (YES in step S804), in step S805, the control unit 101 calculates the total sum of the weight coefficients for each frame rate as the second reference amount.

Figure 9:
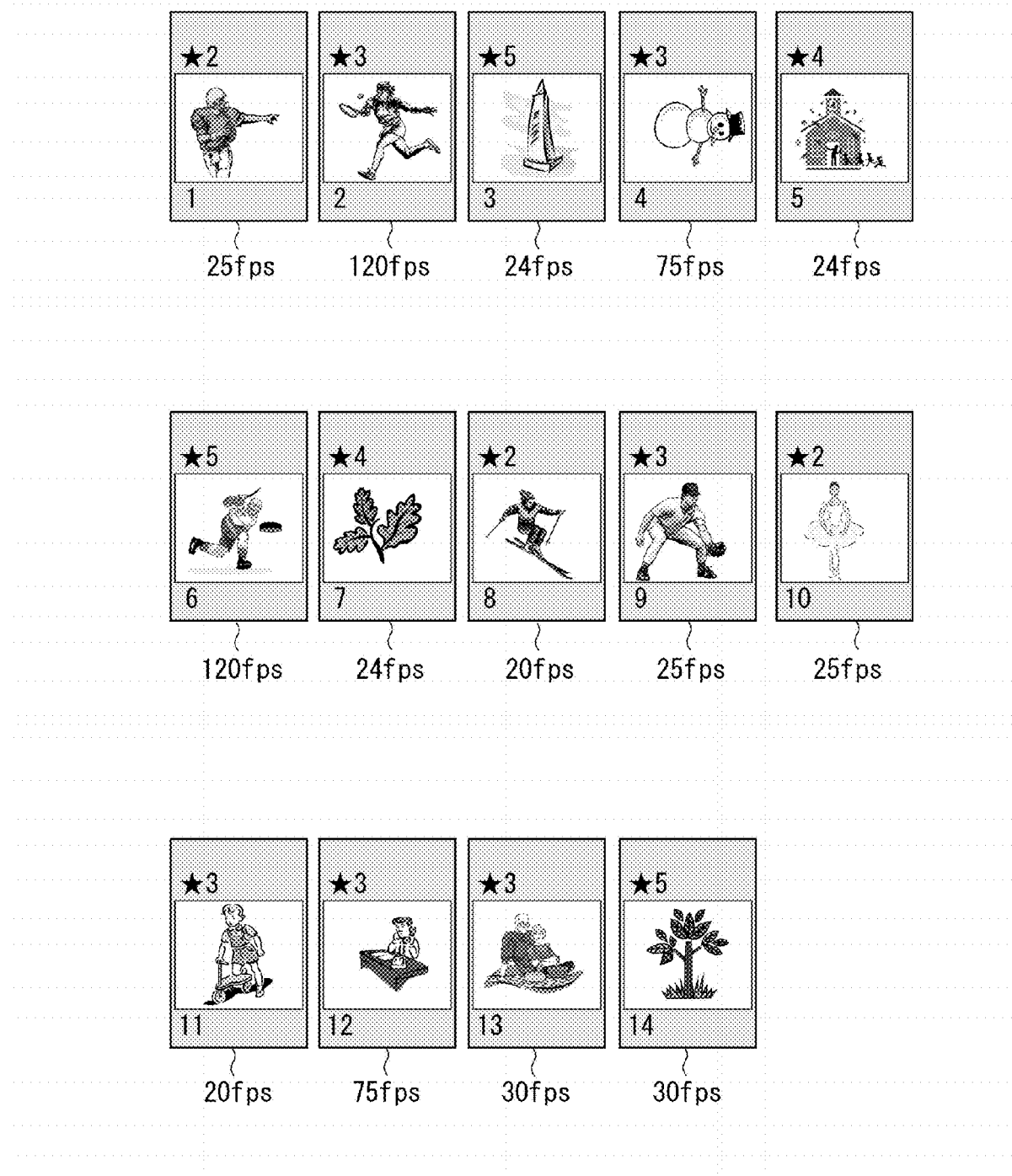
FIG. 9 illustrates moving image data to be edited according to an exemplary embodiment of the present invention.

FIG. 9 illustrates one example of the moving image data to be edited according to the present exemplary embodiment. In FIG. 9, fourteen pieces of the moving image data are selected to be edited, and the order thereof is set. The first, fourth, ninth, tenth, twelfth moving image data belong to the PAL system having the frame rate acquired by multiplying 25 fps by an integer. The second, sixth, thirteenth, and fourteenth moving image data belong to the NTSC system having the frame rate acquired by multiplying 30 fps by an integer. The third, fifth, and seventh moving image data belong to the film system having the frame rate of 24 fps. The eighth and eleventh moving image data belong to other systems.

Thus, of fourteen pieces of the moving image data, four pieces thereof belong to the NTSC system, five pieces thereof belong to the PAL system, three pieces thereof belong to the film system, and two pieces thereof belong to other systems. Further, the moving image data of the present exemplary embodiment includes the rating information that is associated thereto and indicated at a right side of a star mark. For example, the first moving image has "2", the second moving image has "3", and the third moving image has "5".

Accordingly, the first reference amount of the PAL system is 13/3, that of the NTSC system is 16/3, that of the film system is 13/3, and that of other system is 5/3. Thus, the NTSC system has the largest first reference amount. The second reference amounts of the NTSC system are 8/3 for 30 fps and 8/3 for 120 fps. Since the two frame rates have the same second reference amount, the control unit 101 selects 120 fps, which is a larger value.

According to the present exemplary embodiment, the weight coefficients are applied to both of the first and second reference amounts, however, may be applied to either one thereof.

As described above, according to the present exemplary embodiment, further based on the attribute information associated with the moving image data, the frame rate is selected. Therefore, for example, since the frame rate becomes appropriate for the moving image data that is important for the user, a portion corresponding to the important moving image data can be smoothly reproduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-035249 filed Feb. 19, 2010, which is hereby incorporated by reference herein in its entirety.

What is claimed is:

1. A moving image editing apparatus comprising:
   a classification unit configured to classify a plurality of moving image data to be combined, into groups according to a frame rate of each of the moving image data, in which each of the moving image data classified into a same group have a frame rate obtained by multiplying a same value by an integer;
   an obtaining unit configured to obtain, for each of the groups, a total of the moving image data belonging to each of the groups;
   a determination unit configured to determine a preference frame rate based on the frame rates of the moving image data belonging to the group of which the total of the moving image data is the largest among the groups;
   a conversion unit configured to convert the moving image data to be combined into the determined preference frame rate; and
   a combination unit configured to combine the plurality of converted moving image data.

2. The moving image editing apparatus according to claim 1, wherein the total of the moving image data represents at least one of a total number of the moving image data, a total of reproduction time thereof, and a total number of the frames thereof.

3. The moving image editing apparatus according to claim 1, wherein the determination unit determines a frame rate based on a size of the frame rate of the moving image data belonging to the group of which the total of the moving image data is the largest among the groups.

4. The moving image editing apparatus according to claim 1, wherein the determination unit determines a frame rate based on attribute information about the moving image data belonging to the group of which the total of the moving image data is the largest among the groups.

5. The moving image editing apparatus according to claim 4, wherein the attribute information includes at least one of rating, an image size, and a recording rate.

6. The moving image editing apparatus according to claim 1, wherein the group is present at least for any one of an NTSC system, a PAL system, and a film system.

7. A moving image editing method comprising:
classifying a plurality of moving image data to be combined, into groups according to a frame rate of each of the moving image data, in which each of the moving image data classified into a same group has a frame rate obtained by multiplying a same value by an integer;
obtaining, for each of the groups, a total of the moving image data belonging to each of the groups;
determining a preference frame rate based on the frame rates of the moving image data belonging to the group of which the total of the moving image data is the largest among the groups;
converting the moving image data to be combined into the determined preference frame rate; and
combining a plurality of converted moving image data.

8. A non-transitory computer-readable storage medium that stores a program for enabling a computer to realize a moving image editing method, the storage medium comprising:
classifying a plurality of moving image data to be combined, into groups according to a frame rate of each of the moving image data, in which each of the moving image data classified into a same group has a frame rate obtained by multiplying a same value by an integer;
obtaining, for each of the groups, a total of the moving image data belonging to each of the groups;
determining a preference frame rate based on the frame rates of the moving image data belonging to the group of which the total of the moving image data is the largest among the groups;
converting the moving image data to be combined into the determined preference frame rate; and
combining a plurality of converted moving image data.

9. The moving image editing apparatus according to claim 1, wherein said determination unit determines the frame rate based on the total of the moving image data for respective frame rates thereof belonging to the group of which the total of the moving image data is the largest among the groups.

* * * * *